(No Model.) 2 Sheets—Sheet 1.
G. R. THOMSON & J. B. JOHNSON.
LAND ROLLER AND SEED SOWER.
No. 342,053. Patented May 18, 1886.
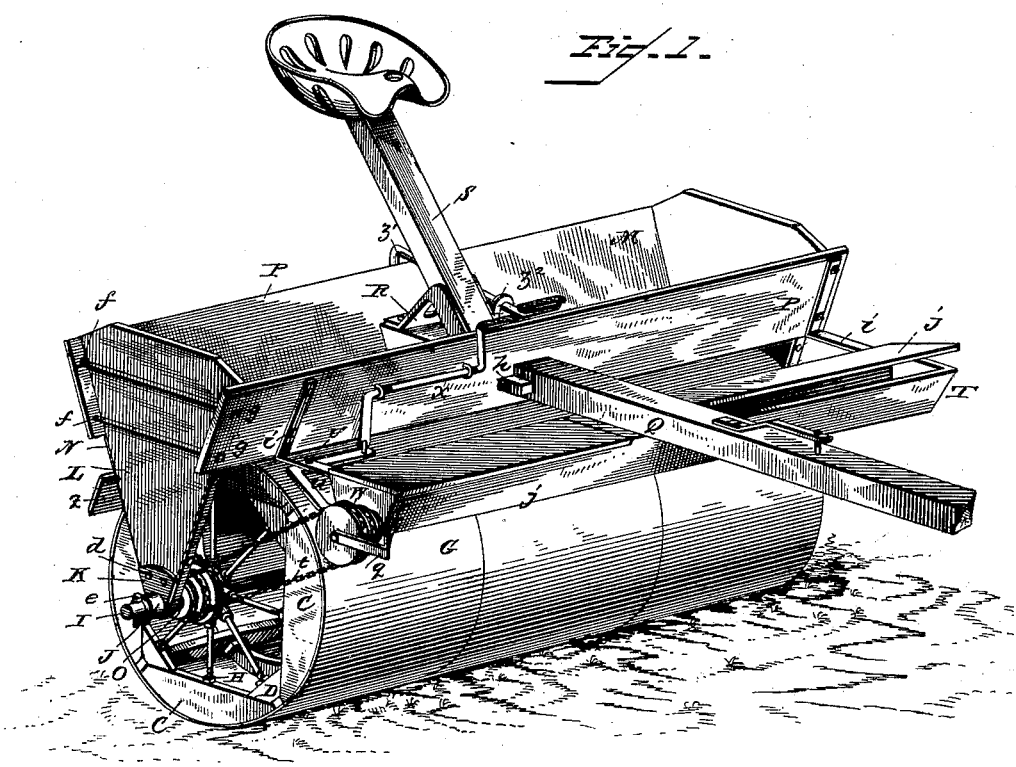
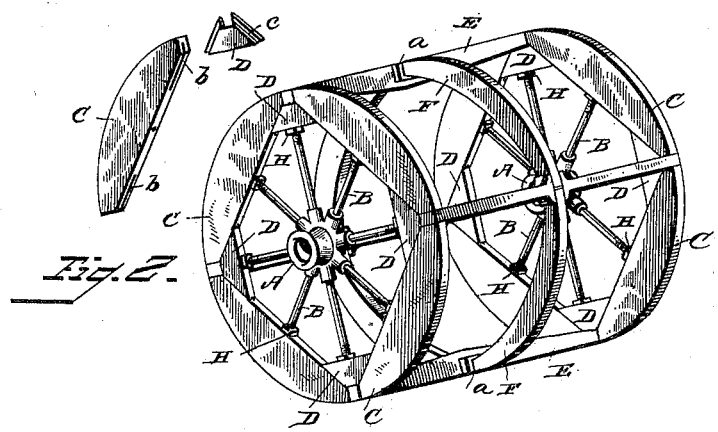

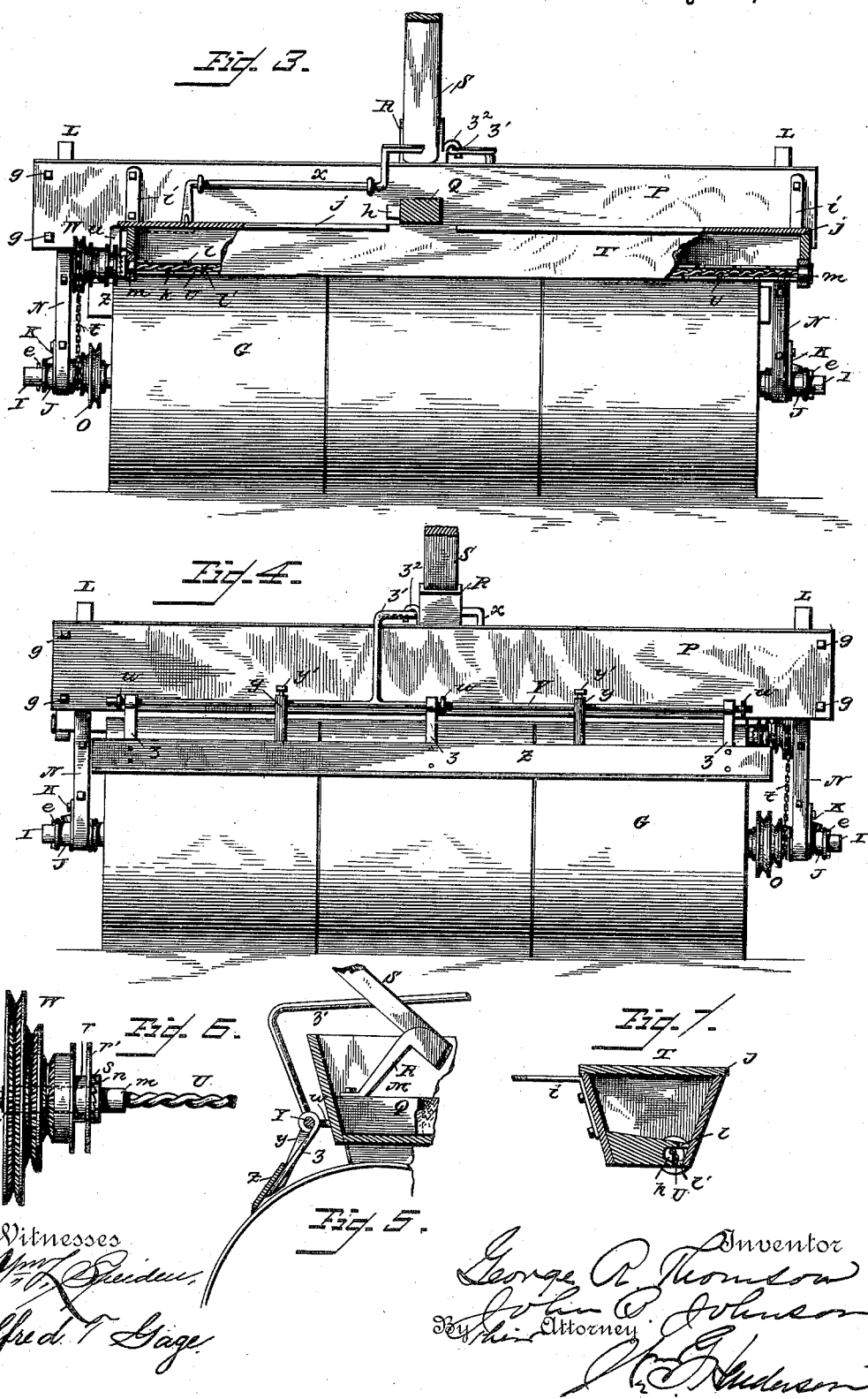

UNITED STATES PATENT OFFICE.

GEORGE R. THOMSON AND JOHN B. JOHNSON, OF GOUVERNEUR, NEW YORK.

LAND-ROLLER AND SEED-SOWER.

SPECIFICATION forming part of Letters Patent No 342,053, dated May 18, 1886.

Application filed January 20, 1886. Serial No. 189,173. (No model.)

*To all whom it may concern:*

Be it known that we, GEORGE R. THOMSON and JOHN B. JOHNSON, citizens of the United States, residing at Gouverneur, in the county of St. Lawrence and State of New York, have invented certain new and useful Improvements in Land-Rollers and Seed-Sowers; and we do hereby declare the following to be a full, clear, and exact description of the invention, such as will enable others skilled in the art to which it appertains to make and use the same.

Our invention has reference to land-rollers and seed-sowers, and has for its object, first, to provide a skeleton frame for the peripheral band or bands of the roller which can be adjusted and tightened to the band, so as to afford a rigid and firm support for the same, and permit the use of a lighter iron for the band; second, to provide for the feed of the seed from the seed-box in regulated quantities; and, lastly, to generally simplify and cheapen the construction of such implements and to increase their durability and general efficiency; and to such ends the invention consists in the construction, and also in the combination, of parts, hereinafter particularly described, and then pointed out by the claims, reference being had to the accompanying drawings, forming part of the same, and in which—

Figure 1 is a perspective of the sower and roller. Fig. 2 is a perspective of the roller-frame, also of a felly and corner-block detached. Fig. 3 is a front view of the sower and roller, with a portion of the tongue and seed-box broken away and sectioned. Fig. 4 is a rear view of the sower and roller. Fig. 5 is a detail view with portions of the roller and stone-box broken away and sectioned. Fig. 6 is a detail of the screw-feed and pulleys on an enlarged scale. Fig. 7 is a section through the seed-box on an enlarged scale.

In the drawings the skeleton frame is represented as composed of hubs A, with which are cast, or into which are screwed, spokes B, the outer ends of which are screw-threaded, and some of which enter fellies C loosely, so that the latter may be adjusted thereon, while others enter in the same manner and for the same purpose corner or angle wedge-blocks D, which bear against the inner faces of the fellies at their meeting-points. The fellies at their ends bear against the sides of longitudinal bars E, at the ends of the latter, which intermediate of their ends are formed with sockets a, into which fit the ends of the cross-bars F, made, preferably, of cast-iron or other metal, and which afford additional strength to the frame and support for the peripheral band or rim of the roller G, which is made, preferably, of wrought-iron, but may be made of steel or other metal, and which fits around the skeleton frame. The band or rim may be in one or more sections, and after being applied to the frame the latter is tightened up against the inner face of the same by means of the nuts H on the threaded portion of the spokes, which force the fellies, wedges, and bars outwardly against the band or rim. The nuts to the spokes that enter the fellies might be omitted and the wedges relied on to force out the fellies; but both are preferably used and the wedge-blocks might be omitted; but it is desirable to use them, as they not only assist in tightening the fellies, but also serve as strengthening-braces for the same at their joints or ends. The inner faces of the fellies, near their ends, are preferably formed with grooves b, and the wedge-faces of the blocks with tongues c, to fit in the grooves, so as to effect a stronger or closer union between the two parts; but we do not limit ourselves to such construction. The roller so constructed turns on the shaft I, which has bearings in the boxes J, formed with flanges K, which bear against the faces of the standards L, formed, preferably, of heavy plank, and constituting the ends of the stone-box M, and to which also the boxes are held by means of bolts d, passed through both the flanges and standards. The boxes fit in ways cut in the lower ends of the standards, and, in addition to the bolts, are further held in place and braced by the straps N, which are secured by screws or other means to the edges of the standards, and pass down beneath and around the standards and boxes, as appears from Figs. 1 and 3. Linchpins e pass through the shaft or axle I outside of the boxes, so as to hold the shaft or axle to its place. At one end of the axle a series of pulleys, O, of varying diameter will be secured by bolts to the hub A of the roller, between it and the end of the box J, so as to turn with the roller. Instead of so securing the pulleys to the roller, they may be keyed to the shaft, and the hub of the roller also keyed to the shaft, so that they all will turn together, or any other suitable way suggesting itself to the mechanic may be availed of to cause the roller to transmit motion to the pulleys, and as such variations do not involve invention they are not illustrated in detail. As stated, the standards L form the ends of the stone-box M, and the front and back of said box are formed by the pieces or boards P, which are secured to the standards by threaded clamping-rods $f$, having nuts $g$ on their ends. The tongue Q passes through this stone-box, and a wedge, $h$, may be used to bind the two parts tightly together. To the tongue inside of the box is secured a casting, R, which forms the base for the standard S of the driver's seat, and to the under side of the tongue in front of the box the seed-box T is bolted. This box is further held by brace-irons $i$, secured to the box and fastened to the stone-box by means of the rods $f$ and nuts $g$. The box is provided on each side of the tongue with hinged covers $j$, and its bottom is formed with a longitudinal groove or way, $k$, and with a series of holes or openings, $l\ l'$, opening into the same at top and bottom, and preferably out of line with each other. In this groove there fits a screw-feed, N, preferably made of two strands of wire twisted together so as to form cups or spaces, into which the grass or other seed is received as it passes through the openings $l$, and carried under and forced through the openings $l'$, so that it drops into the ground beneath. In this way the seed is dropped in regulated quantities into the ground. The wire at each end is secured to a round block, thimble, or bearing, $m$, which fits and turns in a suitable box at each end of the seed-box. The block or thimble at one end of the wire is provided with a ratchet-clutch, $n$, from which extends outwardly a journal, $o$, the end being reduced, as shown at $p$, so that the reduced end will fit and rest in an arm, $q$, extending out from the seed-box. On this journal $o$ fit a series of pulleys, W, of varying size, the pulley next to the ratchet-clutch $n$ having a sleeve, $r$, sliding in and out of it, but so as to turn with it, which sleeve is provided with a flange, $r'$, and a ratchet-clutch, $s$, to engage with the ratchet-teeth of clutch $n$. When the two ratchets are brought together, so as to couple together the pulleys and the screw-feed, the latter is revolved by the power transmitted from the drive roller-pulley through chain $t$ to the seed-box. The pulleys W and screw-feed are coupled and uncoupled by means of a bell-crank lever, $u$, having a bent and forked end to straddle the flange $r'$ of the pulleys W, and pivoted or fulcrumed by a pivot or bolt, $v$, to the brace-rod $i$, the said bell-crank lever being linked to one end of a foot-crank lever, $x$, journaled to the front of the stone-box, and within easy reach of the foot of the driver seated on the standard S. The ratchet-teeth permit the roller to be moved backward without working the screw-feed, and by sliding the clutch-pulley sleeve away from the screw-feed clutch the two will be separated, so that the screw-feed will not operate. It will thus be seen that the feed of the seed is under the easy and full control of the driver. By shifting the chain $t$ from one pulley to another the feed may be quickened or slackened. To the rear of the stone-box there is journaled a shaft or rod, Y, by means of eyebolts or staples $w$, secured to the box by nuts'. (Not shown.) To this rod there are rigidly secured fingers or arms $y$ by means of set-screws $y'$. The lower ends of said arms bear against the lower face of a metallic scraper, Z, suspended from the shaft or rod Y by means of straps $z$, turning loosely on the rod. This scraper normally hangs over and bears against or extends nearly to the rim of the roller, so as to scrape dirt therefrom. A foot-lever, $z'$, connected with the shaft extends over the stone-box, and through an eyebolt, $z^2$, secured to the tongue, so as to be within easy reach of the foot of the driver. When the driver presses on the foot-lever, the shaft is thus turned so as to press the arms $y$ against the scraper with sufficient force to lift the scraper from the roller.

The several parts constructed and combined substantially as described form a strong, durable, simple, and satisfactory working land-roller and seed-sower, combining lightness with necessary weight, and permitting the parts to be quickly and easily adjusted and tightened, if necessary, and manipulated with comparatively little labor without the requirement of skilled labor.

Having described our invention and set forth its merits, what we claim is—

1. In a land-roller, the combination, with spokes and fellies thereon, of wedge-blocks on the spokes bearing against the fellies, and nuts on the spokes for adjusting said wedge-blocks, substantially as described.

2. In a land-roller, the combination of the spokes, the fellies adjustable on some of said spokes, the wedge-blocks adjustable on the intermediate spokes, and nuts on the spokes to adjust said fellies and wedge-blocks, substantially as described.

3. In a land-roller, the combination of the spokes, the fellies supported on some of said spokes and having grooved ends, and the wedge-blocks supported on the intermediate spokes and formed with tongues entering the grooves of the fellies, substantially as described.

4. In a land-roller, the combination of the longitudinal bars, the spokes, and the fellies supported by the spokes and bearing against the longitudinal bars, substantially as described.

5. In a land-roller, the combination, with the longitudinal bars E, formed with sockets $a$ intermediate of their ends, of cross-bars F, extending transversely to said longitudinal bars and fitting in the sockets of said bars, substantially as described.

6. The frame for supporting the cylindrical rim of a land-roller, composed of longitudinal bars, fellies fitting between said bars, and corner-blocks bearing against the fellies at the angle of their junction, substantially as described.

7. In a land-roller, the combination, with the rim or band, of the frame for supporting said rim or band, composed of the spokes, the fellies adjustable on some of the spokes, the wedge-blocks adjustable on the intermediate spokes and bearing against the fellies, the longitudinal bars formed with sockets between their ends and fitting between the ends of the fellies, and the cross-bars fitting in said sockets, substantially as described.

8. The combination, with the upright standards, of the journal-boxes J, provided with flanges K, secured to the lower ends of the standards, and the straps secured to the standards and extending under said boxes, substantially as described.

9. The combination, with the roller, of the scraper suspended from a support to swing over the roller, fingers to bear against said scraper, and a lever to press said fingers against the scraper to raise the latter, substantially as described.

10. The combination, with the roller, of the shaft journaled to a support, the arms hinged to said shaft and carrying a scraper adjacent to the roller, the fingers secured rigidly to the shaft and adapted to bear against the scraper, and the lever connected to the shaft to press the fingers against the scraper to raise the latter, substantially as described.

11. The combination, with the seed-box having a perforated bottom, said bottom having a groove, $k$, formed therein, as shown, along one edge, of the screw-feed fitting in the groove of the bottom, and operating to pass the seed from the box through perforations in its bottom to the ground, substantially as described.

12. The combination, with a seed-box having openings in its bottom for the passage of seed, of a screw-feed composed of strands of twisted wire, substantially as and for the purposes described.

13. The combination, with a seed-box having a groove in its bottom and perforations above and below said groove, of a screw-feed composed of strands of twisted wire fitting and operating in said groove, substantially as described.

14. The combination, with the seed-box, of a screw-feed composed of twisted wire, having a clutch and journal at one end, a pulley provided with a clutch and sliding on the journal of the screw-feed, and a lever to couple and uncouple said clutches, substantially as and for the purposes described.

15. The combination, with the roller and a series of pulleys of varying size connected therewith, of the seed-box, the screw-feed operating therein and provided with a clutch, the series of pulleys of varying size provided with a clutch to engage with the screw-feed clutch, a band for connecting one set of pulleys with the other, and a lever for coupling and uncoupling the two clutches, substantially as and for the purposes described.

16. The combination, with the roller having a pulley connected therewith, of the seed-box, the screw-feed therein composed of twisted wire, having a ratchet-clutch and journal at one end, a pulley sliding on said journal and provided with a ratchet-clutch coupling with the screw-feed clutch, a band connecting the pulleys, and a lever for coupling and uncoupling the clutches, substantially as and for the purposes described.

17. The combination, with the seed-box, of the twisted screw-feed U, provided with a ratchet-clutch, $n$, and journal $o$, pulleys W, formed with flange $v$ and ratchet-clutches $s$, and crank-lever $u$, engaging flange $r'$ of pulleys W, substantially as and for the purposes described.

In testimony whereof we affix our signatures in presence of two witnesses.

GEORGE R. THOMSON.
JOHN B. JOHNSON.

Witnesses:
DAVID H. BALDWIN,
BRADLEY L. BARNEY.